March 23, 1937.   N. D. LOWE   2,074,407

FISH SCREEN

Filed Feb. 17, 1936

INVENTOR,
NOLAN D. LOWE.
BY
ATTORNEYS.

Patented Mar. 23, 1937

2,074,407

UNITED STATES PATENT OFFICE 2,074,407

FISH SCREEN

Nolan D. Lowe, Preston, Idaho, assignor of one-half to Lester D. Lowe, Preston, Idaho Application February 17, 1936, Serial No. 64,371

5 Claims. (Cl. 210—174)

This invention relates to fish screens, more particularly of the type used to prevent fish from entering irrigating ditches, thereby to avoid consequent loss of the fish.

The primary object of the invention is to provide an efficient structure of this character which automatically cleans itself of collected débris and deposits the latter upon the downside of the stream and at the same time effectually prevents the passage of fish through the sluice, thus functioning in a dual manner.

A further object of the invention is to provide novel means for preventing clogging of the sluice by débris entering the latter.

The invention has still further and other objects, which will later be set forth and manifested in the course of the following description.

Figure 1:
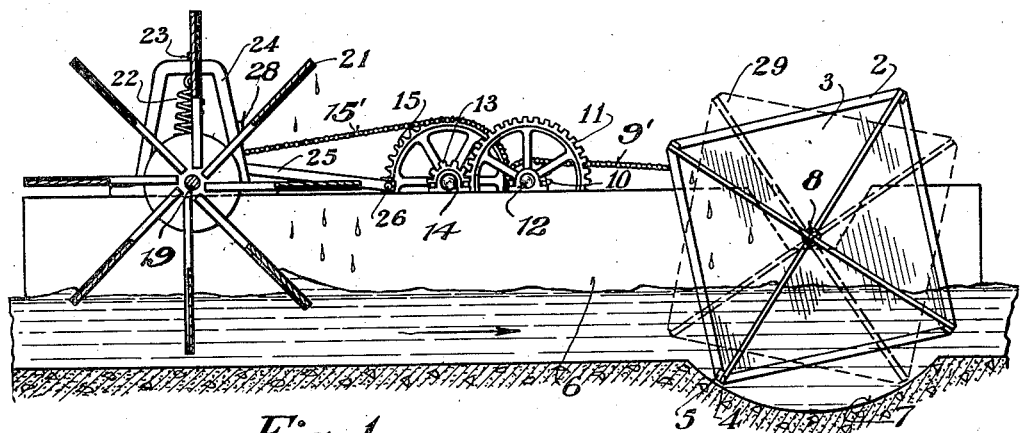
Fig. 1 is a longitudinal sectional view of the invention.

In proceeding in accordance with the present invention a sluice 6 is provided which has a curved depression 7 in its bottom adjacent the outlet of the sluice.

The device for preventing the fish from entering the ditch is composed of a rotating screen 2 which has end plates 3 mounted on a shaft 8 and bars 4, which radiate from the shaft, the end members 3 and the bars 4 being connected by paddle members 5 which extend transversely of the sluice. A sprocket 9 is secured to one end of the shaft 8 and through a chain 9' drives a sprocket 10 mounted on a shaft 12 which latter is suitably journaled at one end on the top of a side of the sluice. A gear 11 is keyed to the shaft 12 and meshes with a pinion 13 that is keyed onto a shaft 14, which latter is likewise journaled at one end on said side of the sluice. The shafts 12 and 14 are journaled at their outer ends on a support 18 suitably carried by the sluice. A gear 15 is keyed to the shaft 14 and through a sprocket chain 15' drives a pinion 16 mounted on shaft 19 of a paddle wheel 21, the shaft 19 being journaled at 20 onto the opposite sides of the sluice.

For the purpose of permitting fluctuating or upward and downward movement of the paddle wheel in order to allow débris to pass the paddle wheel without clogging, the shaft 19 of the wheel is journaled at 20 onto arms 25 which latter are pivoted at 26 to brackets 27, carried by the opposite sides of the sluice. A pair of supports 24 are mounted on the respective opposite sides of the sluice at the top thereof and are of inverted U-shape. Screw eyes 23 extend through the tops of the supports 24 and are connected to one end of spiral springs 22 which latter are connected at their opposite ends to the arms and serve to yieldingly support the paddle wheel so as to permit upward movement thereof should the paddle wheel encounter an abnormal amount or large pieces of débris. The screw eyes obviously enable adjustment of the degree of tension of the springs 22. Guides 28 are suitably affixed to the sides of the sluice and are spaced from the supports 24, the arms being freely movable in said space so as to guide the vertical movements of the arms.

Figure 2:
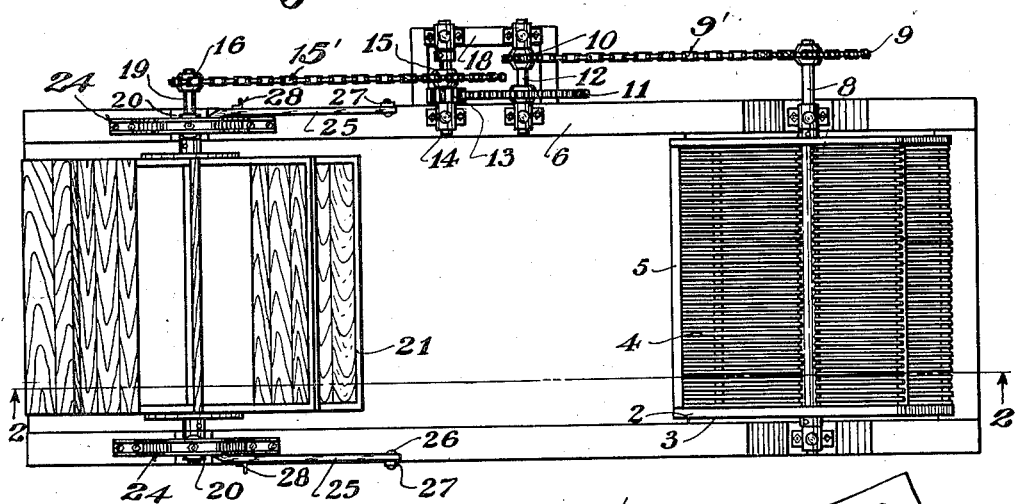
Fig. 2 is a top plan view thereof.
Figure 3:
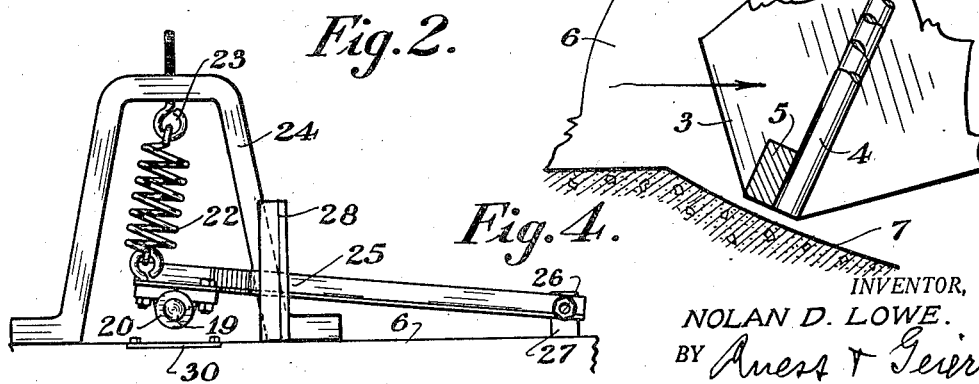
Fig. 3 is an enlarged detailed view showing in side elevation the means for preventing clogging.
Figure 4:
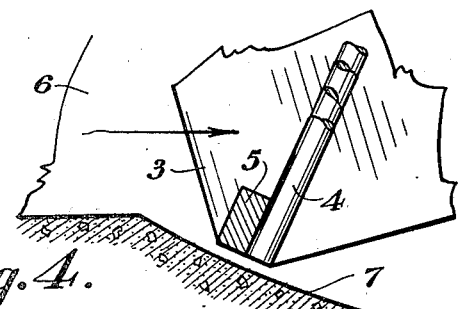
Fig. 4 is an enlarged detailed view of the device for preventing fish from entering the sluice.

In operation, it will be seen that the current of water flowing through the sluice rotates the paddle wheel 21 and through the gear and sprocket chain connections of the latter with the screening device 2 effects clockwise rotation of the latter. The bars 4 of the screening device are, as shown in Fig. 2, closely related and due to the depression 7 in the bottom of the sluice it will be apparent that fish will be prevented from passing the screening device 2. Should an abnormal amount of débris or the like enter the sluice it will be seen that the paddle wheel can move upwardly and allow free passage of the débris, thus preventing clogging of the sluice. The screen 2 functions in a dual manner, namely, it prevents fish from passing the same as well as to raise débris encountering the screen upwardly in a clockwise direction and throw the débris over and past the screen on the downside of the stream so that the sluice is automatically maintained clear of débris, and clogging thereby completely eliminated.

What I claim is:

1. In a device of the type set forth, a sluice having a curved depressed portion disposed in the plane of its bottom, a fish screen and debris remover rotatably carried by the sluice and composed of a shaft having substantially square plate-like end members, series of closely spaced bars radiating from the shaft and disposed between the end members and having outer ends terminating adjacent the respective ends of the end members, paddle members connected to the outer ends of the bars and movable through the depressed portion of the sluice, a rotatable paddle wheel carried by the sluice and operable by the current flowing therethrough, and means actuated by the paddle wheel to rotate the screen in a direction opposite to that of the flow of the current.

2. In a device of the type set forth, a sluice, a fish screen and debris remover rotatably carried by the sluice, a paddle wheel operable by the current flowing through the sluice and having a shaft, substantially horizontal arms pivoted at one end to the sluice, means to rotatably connect the shaft to the opposite ends of the arms, inverted U-shaped supports carried by the sluice, guides carried by the sluice and spaced from the supports and in which space the arms are disposed for vertical guided movement, springs connected to the tops of the supports and to the arms to yieldingly support the latter, and means to operate the screen from the paddle wheel.

3. In a device of the type set forth, a sluice having a curved depressed portion disposed in the plane of its bottom, a fish screen and debris remover rotatably carried by the sluice and composed of a shaft having end members on the shaft, series of closely spaced radial bars disposed between the end members and radiating from the shaft, paddle members connected to the outer ends of the bars and operating through the depressed portion of the sluice, a paddle wheel carried by the sluice and operable by the current flowing therethrough, and means operable by the paddle wheel to actuate the screen.

4. In a device of the type set forth, a sluice, a fish screen and debris remover rotatably carried by the sluice, a paddle wheel, operable by the current flowing through the sluice and having a shaft, shaft carrying members pivoted to the sluice, means to rotatably connect the shaft to the members, supports carried by the sluice, guides carried by the sluice and spaced from the supports to receive portions of the pivoted members in said space whereby said supports and guides conjointly afford means to guide vertical movements of the pivoted members, springs connected to the supports and to the pivoted members to yieldingly sustain the latter, and means to actuate the screen from the paddle wheel.

5. In a device of the type set forth, a sluice having a curved depressed portion disposed below the plane of its bottom, a paddle wheel rotatably carried by the sluice and operable by the current flowing through the sluice, a fish screen and debris remover including a shaft rotatably carried by the sluice, series of radial and closely spaced bars carried by the shaft and each operable through the depression to prevent fish from passing the screen, debris paddles carried by the rods and also operating in the depression to raise debris over the screen and to deposit same on the down side of the stream, and means operable by the paddle wheel to actuate the screen.

NOLAN D. LOWE.